US006840483B1

(12) United States Patent
Dickens

(10) Patent No.: US 6,840,483 B1
(45) Date of Patent: Jan. 11, 2005

(54) CABLE FEED BUSHING AND METHOD OF INSTALLING A CABLE THROUGH A WALL OR OTHER STRUCTURE

(75) Inventor: James E. Dickens, Ocoee, FL (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/897,568

(22) Filed: Jul. 2, 2001

(51) Int. Cl.[7] .................................................. F16L 5/00
(52) U.S. Cl. ...................... 248/56; 248/74.1; 411/405
(58) Field of Search ...................... 248/56, 27.1, 74.1; 411/405, 410

(56) References Cited

U.S. PATENT DOCUMENTS

| 173,356 | A | * | 2/1876 | Sloan |
| 3,073,206 | A | * | 1/1963 | Rudolph ........................ 85/45 |
| 3,076,668 | A | * | 2/1963 | Famely ........................ 285/159 |
| 3,174,383 | A | * | 3/1965 | Heil ................................ 85/1 |
| 3,285,551 | A | * | 11/1966 | Tschanz ........................ 248/56 |
| 3,983,598 | A | | 10/1976 | Rosan, Sr. et al. ................ 16/3 |
| 4,842,548 | A | * | 6/1989 | Bolante ....................... 439/461 |
| 5,072,072 | A | * | 12/1991 | Bawa et al. ............ 174/65 SS |
| 5,213,290 | A | * | 5/1993 | Moretti ......................... 248/56 |
| 5,366,330 | A | * | 11/1994 | Cosenza ...................... 411/405 |
| 6,153,035 | A | * | 11/2000 | Van Laeken ............... 156/73.5 |
| 6,224,309 | B1 | * | 5/2001 | Yamamoto .................... 411/11 |
| 6,290,445 | B1 | * | 9/2001 | Duran et al. ................ 411/423 |
| 6,300,569 | B1 | * | 10/2001 | Mullen, Jr. ............... 174/65 R |

* cited by examiner

Primary Examiner—Leslie A. Braun
Assistant Examiner—Steven Marsh

(57) ABSTRACT

A cable feed bushing and method of installing a cable through a wall or other structure. In one embodiment, the bushing has a conically-shaped body and a head portion formed thereon. Threads or other retainer formations are provided on the exterior surface of the body portion to retain it in a hole provided in the wall. A cable-receiving passageway extends through the bushing to permit one or more cables to be passed therethrough. Installation formations may be provided on or in the head portion to facilitate installation of the bushing in a hole in the wall. The formations may enable a special tool to engage the head portion to apply a rotational force thereto.

4 Claims, 4 Drawing Sheets

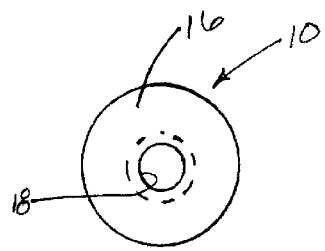
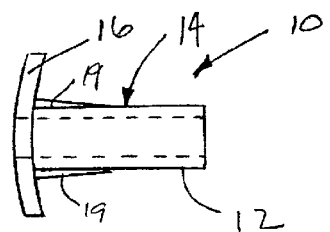
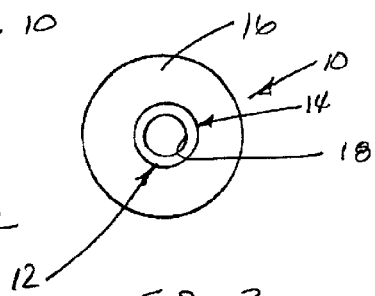
FIG. 2
PRIOR ART
FIG 1
PRIOR ART
FIG. 3
PRIOR ART
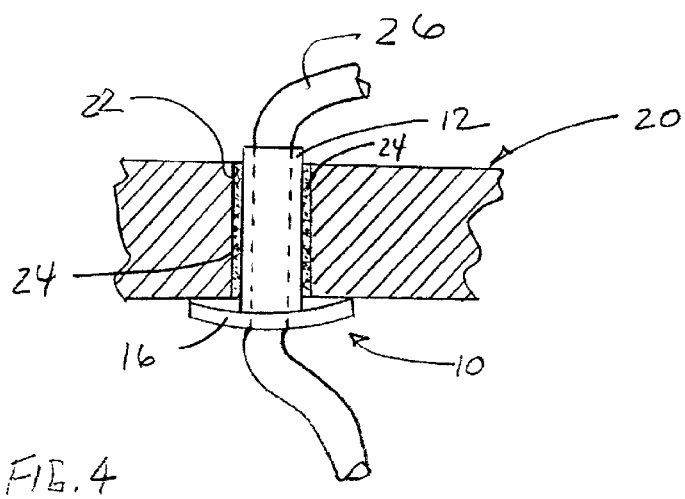
FIG. 4
PRIOR ART

CABLE FEED BUSHING AND METHOD OF INSTALLING A CABLE THROUGH A WALL OR OTHER STRUCTURE

CROSS-REFERENCE TO RELATED APPLICATIONS

Not applicable.

FEDERALLY SPONSORED RESEARCH

Not applicable.

BACKGROUND OF THE INVENTION

1. Field of the Invention

The subject invention relates to cable installation devices and methods and, more particularly, to a cable installation bushing and methods of inserting and supporting one or more cables in a wall or other structure.

2. Description of the Invention Background

Each day, perhaps millions of miles of cables and wires transport a variety of electronic and other signals to various types of equipment. For example, in the telecommunications industry, cables and wires are used to transmit signals etc. to operate telephones, computers, televisions, etc. In many applications, the wires or cables must be passed through a wall or other structure to supply a desired signal to a device or other apparatus. It is desirable to support the wire or cable where it enters the wall to prevent the cable from becoming damaged by the portion of the wall or other structure through which it passes. In some applications bushings have been employed to accomplish that task.

One prior bushing arrangement is depicted in FIGS. 1–4. Such bushing 10 has a first portion 12 that is adapted to be inserted into a hole 22 that is provided in the wall or other structure 20. The bushing 10 is commonly fabricated from plastic and the outer surface 14 of the first portion 12 is relatively smooth. A flanged portion 16 is provided on one end of the first portion 12 as shown. A hole 18 extends through the flange portion 16 and the first portion 12 for receiving a wire or cable 26 therethrough. Gussets 19 are formed between the flange 16 and the first portion 12 to support those elements relative to each other.

A bushing 10 is installed by first drilling a hole 22 in the wall or other structure 20. In the arrangement depicted in FIG. 4, the structure 20 comprises a horizontally oriented wall such as a ceiling structure. After the hole 22 has been drilled, an adhesive material 24 is applied around the first portion 12 and the first portion 12 is inserted into the hole 22. The bushing 10 must be retained in that position until the adhesive 24 sufficiently cures to retain the bushing 10 in position. If the installer does not retain the bushing 10 in position until the adhesive 24 has sufficiently cured, the bushing 10 often times falls out of the hole 22. In addition, if too much adhesive 24 is applied, it can squeeze out from between the flange 16 and the wall 20 and foul the wall surface. On the other hand, if an insufficient amount of adhesive 24 is applied, the bushing 10 may fall out of the hole 22 when a cable 26 is installed through the hole 18 in the bushing 10.

Another bushing arrangement is disclosed in U.S. Pat. No. 3,983,598 to Rosan, Sr. et al. This patent teaches a "self-boring" bushing for supporting a conduit through a wall. That bushing, however, is designed for installation with a wrench and, thus, the head arrangement is unattractive and can detract from the aesthetics of the wall or other structure through which the conduit extends.

Thus, there is a need for a bushing for supporting a cable or cables in a wall or other structure that is easy to manufacture and install without the need for adhesive or other retainer devices.

Yet another need exists for a bushing having the above-mentioned attributes that is relatively aesthetically pleasing and that does not detract from the aesthetic appearance of the wall or other structure in which it is installed.

There is a further need for a method of installing a protective cable bushing in a wall or other structure without risking fouling the wall with adhesive and other retaining mediums.

Another need exists for a bushing and method of installing a bushing that does not require the installer to hold the bushing in position until adhesive sufficiently cures to retain the bushing in position.

SUMMARY OF THE INVENTION

In accordance with one form of the present invention, there is provided a cable feed bushing and method of installing a cable through a wall or other structure. In one embodiment, the bushing has a conically-shaped body and a head portion formed thereon. Threads or other retainer formations are provided on the exterior surface of the body portion to retain it in a hole provided in the wall. A cable-receiving passageway extends through the bushing to permit one or more cables to be passed therethrough. Installation formations may be provided on or in the head portion to facilitate installation of the bushing in a hole in the wall. The formations may enable a special tool to engage the head portion to apply a rotational force thereto.

It is a feature of the present invention to provide a bushing that is easy to manufacture and install.

It is another feature of the present invention to provide a bushing that can be readily installed in a variety of structures without the need for the installer to retain the bushing in position with an adhesive or while the adhesive cures.

Yet another feature of the present invention is to provide a bushing with one or more of the above-mentioned characteristics that does not detract from the aesthetic appearance of the wall or other structure to which it is attached.

Accordingly, the present invention provides solutions to the shortcomings of prior bushing arrangements and cable installation methods. Those of ordinary skill in the art will readily appreciate, however, that these and other details, features and advantages will become further apparent as the following detailed description of the embodiments proceeds.

BRIEF DESCRIPTION OF THE DRAWINGS

In the accompanying Figures, there are shown present embodiments of the invention wherein like reference numerals are employed to designate like parts and wherein:

FIG. 1 is a side elevational view of a prior art bushing;

FIG. 2 is a left end view of the prior art bushing depicted in FIG. 1;

FIG. 3 is a right end view of the prior art bushing of FIGS. 1 and 2;

FIG. 4 is a cross-sectional view of the bushing of FIGS. 1–3 installed in a horizontally-oriented ceiling structure with adhesive;

DETAILED DESCRIPTION OF THE EMBODIMENTS OF THE INVENTION

Figure 10:
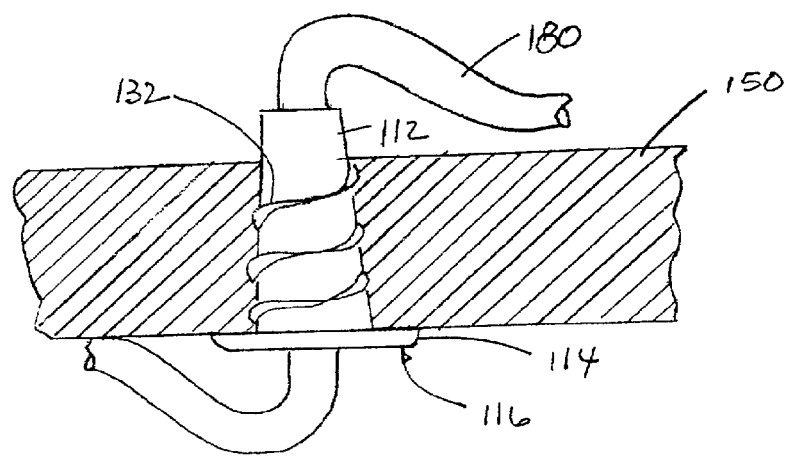
FIG. 10 is a view of the bushing of FIGS. 5–8 installed in the horizontally-oriented wall shown in cross-section and having a cable passing therethrough.
Figure 11:
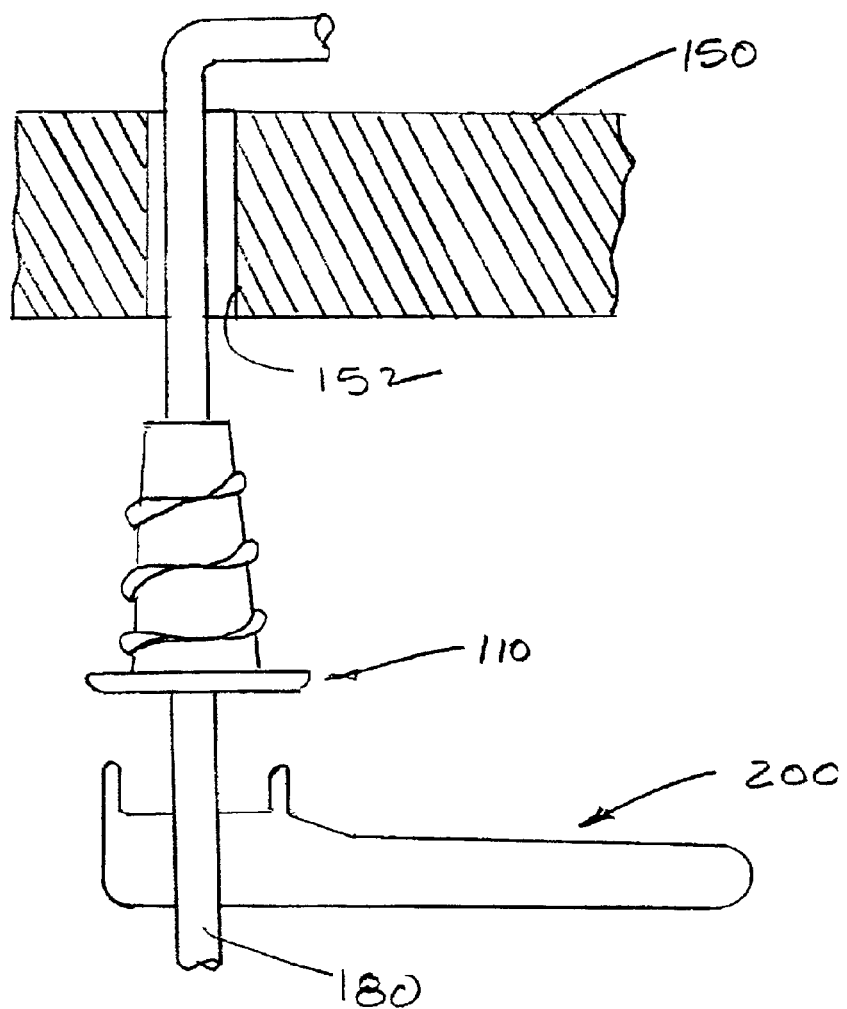
FIG. 11 is a view of a bushing of the present invention being installed in a wall shown in cross-section utilizing another method of the present invention.

Referring now to the drawings for the purposes of illustrating the present preferred embodiments of the invention only and not for the purposes of limiting the same, FIGS. 5–9 illustrate one cable support apparatus or bushing embodiment 110 of the present invention. Those of ordinary skill in the art will appreciate that the bushings 110 of the present invention may be readily installed in a variety of walls and various structures, regardless of the wall or structure's composition or orientation. Thus, while FIG. 10 depicts the bushing 110 as being installed in a horizontally-oriented structure that might be fabricated from commercially available drywall board or plasterboard, the skilled artisan will appreciate that the various bushing embodiments of the present invention may be installed in a variety of different structures regardless of how the structure is oriented or its particular composition. In addition, as used herein, the term "cable" may encompass a variety of different wire conductors, fiber optic cables, tubing conduits, etc.

Figure 6:
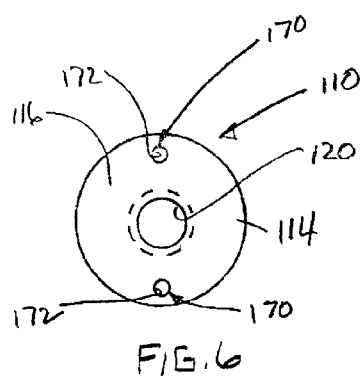
FIG. 6 is a left end view of the bushing embodiment of FIG. 5.
Figure 5:
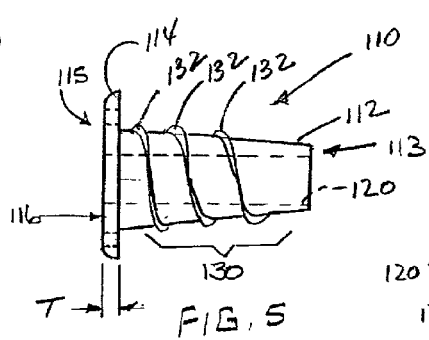
FIG. 5 is a side elevational view of an embodiment of a bushing of the present invention.
Figure 7:
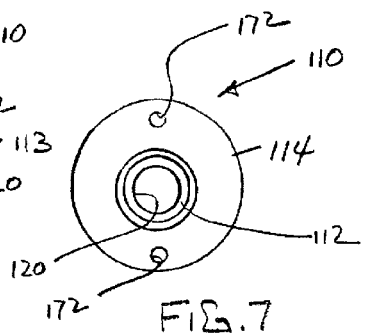
FIG. 7 is a right end view of the bushing embodiment of FIGS. 5 and 6.
Figure 8:
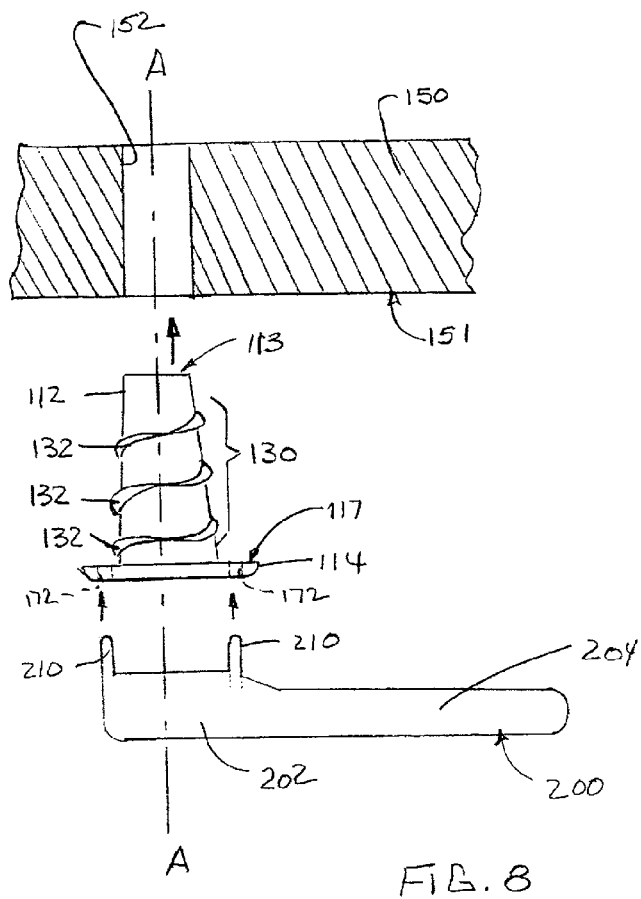
FIG. 8 is a cross-sectional view of the bushing of FIGS. 5–7 initially being installed in a hole in a horizontally-oriented wall with a tool of the present invention with the wall shown in cross-section.
Figure 9:
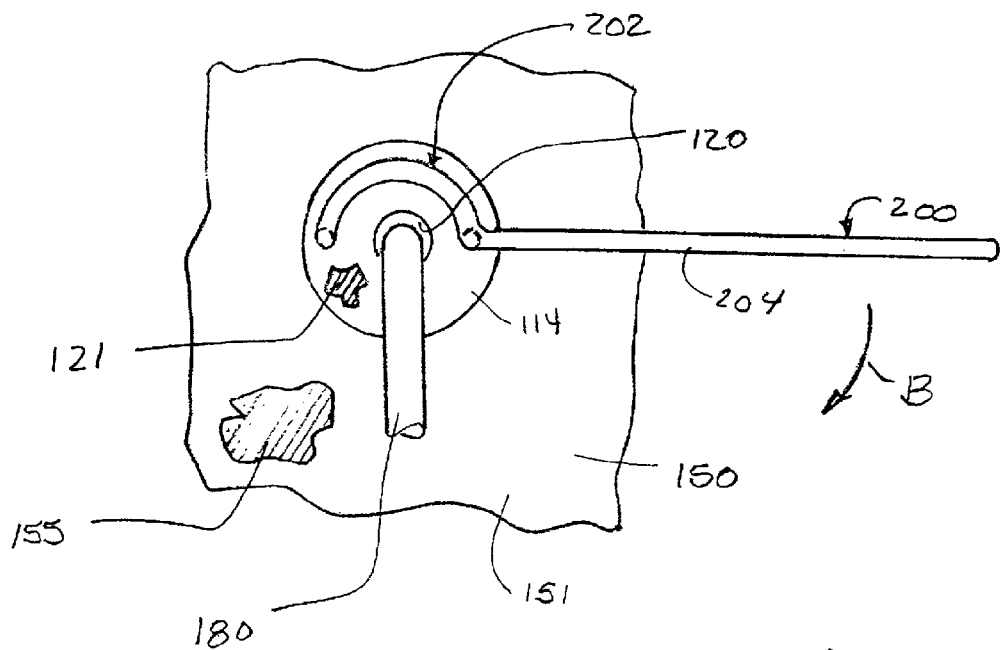
FIG. 9 is a view of the bushing of FIG. 9 being installed with a tool of the present invention.

As can be seen in FIGS. 5–7, the bushing 110 includes an elongated body portion 112 and a head portion 114. The elongated body portion 112 contains a "distal" end 113 and an opposite "proximal" end 115 on which the head portion 114 is formed. The embodiments shown in FIGS. 5–11 have a conical-shaped body portion 112. Those of ordinary skill in the art will appreciate that the conical shape will serve to further retain the bushing in place. However, it will be further appreciated that the body portion 112 may also be-cylindrical shaped, etc. While the head portion 114 has a round shape as can be most particularly seen in FIG. 6, those of ordinary skill in the art will appreciate that the head portion 114 may be provided in a myriad of other shapes that will not detract from the aesthetical appearance of the structure in which it is installed. For example, it will be appreciated that by providing the head portion 114 with a relatively low profile or thickness ("T"), and a smooth outer surface 116, the bushing 110 can be relatively unnoticeable when installed. In one embodiment, it is preferable that thickness "T" not exceed ¹⁄₁₆ of an inch. Thus, as used herein, the term "low profile" means ¹⁄₁₆ of an inch or less.

Extending through the head portion 114 and the body portion 112 is a cable-receiving passageway 120. Passageway 120 may have a diameter that is large enough to permit one or more cables extend therethrough as shown in FIG. 10.

Also in this embodiment, to affix the bushing 110 to a wall or structure 150, a "retainer" or "retaining means" 130 in the form of a thread 132 is provided around the exterior surface of the body portion 112. In the embodiment depicted in FIGS. 6–10, the thread is a helical or spiral thread. However, other thread arrangements, serrations, etc. could conceivably be used.

To facilitate quick and easy installation of the bushing 110 into the wall 150 without making the head portion 114 obtrusive, "installation means" 170 is provided in the exterior surface of the head portion 114. Such "installation means" does not encompass the shape of the head portion 114, but instead comprises at least two formations provided on the head portion 114. In the embodiment depicted in FIGS. 5–11, the installation formation comprise two small holes or pockets 172 provided in the head portion 114. In the embodiment depicted in FIGS. 6 and 7, the holes or pockets 172 are diametrically opposed to each other and are sized to receive therein corresponding engagement projections 210 formed on an installation tool 200. In one embodiment, the installation tool 200 includes a body portion 202 from which the engagement projections 210 protrude. In addition, the installation tool 200 may be provided with a handle 204 to facilitate easier manipulation of the tool 200 during the installation process. Those of ordinary skill in the art will appreciate that the tool may be fabricated from metal or rigid plastic that will enable the installer to apply sufficient rotational torque to the bushing during installation. It will be also appreciated that other shapes and numbers of holes, protrusions, etc. may be provided on the head portion to coact with an appropriately shaped tool.

One method of installing the bushing 110 will now be described. To commence the installation process, the installer first drills a hole 152 into the wall 150 or other support 9D structure. See FIG. 8.

After drilling the hole 152 in the wall 150, the installer inserts the distal end 113 of the body portion 112 into the hole and begins to rotate the bushing 110 about the axis of the hole 152 or installation axis "A—A" until the threads 132 begin to engage the inside surface of the hole 152. The installer may wish to continue to thread the bushing 110 into the hole 152 "by hand" until it becomes too difficult to turn. Thereafter, the user may then insert the engagement projections 210 on the tool 200 into the holes 172 or pockets provided in the head portion 114. The user then grasps the handle portion 204 of the tool 200 and continues to turn the bushing 110 by rotating the handle 204 about the installation axis A—A in the direction represented by arrow "B" in FIG. 9, for example. This process is continued until the rear surface 117 of the head portion 114 contacts the outer surface 151 of the wall 150. After the user has installed the bushing 110, a cable or cables 180 may then be inserted through the passageway in the bushing.

For installations wherein the cable 180 is already protruding out through a hole 152 in the wall 150, the user simply inserts the protruding cable 180 through the cable passageway 120 in the bushing 110 and slides the bushing 110 over the cable 180 until the distal end 113 of the bushing may 110 be inserted into the hole 152 in the wall 150 through which the cable 180 is protruding. The user then completes the installation process described above. The reader will appreciate that when employing this method, the diameter of the cable passage 120 should be sufficiently large enough to permit the bushing 110 to rotate unimpeded around the cable 180 so that the cable 180 is not rotated or twisted as the bushing 110 is installed. See FIG. 11.

The reader will appreciate that such unique and novel bushing arrangement is relatively unnoticeable when installed. To further enhance the bushing's unobtrusiveness, the bushing may be provided with a color 121 that matches the color 155 of the wall or other structure 150. See FIG. 10.

In one embodiment, the bushing 110 may be molded as a single unit from a polymeric material having a color that matches the color of the outer surface of the wall or other structure. The skilled artisan will appreciate, however, that the bushing could also be machined from a block of polymeric material. The head of the bushing 110 could be molded or otherwise fabricated apart from the elongated body and attached thereto by an appropriate fastener such as adhesive, welds, etc. It will be further appreciated that the busting 110 may be molded or machined from other materials such as metal, rubber, etc. without departing from the spirit and scope of the present invention.

When employing materials that have a color that differs from the color of the wall or other structure, the entire bushing 110 or just the exposed head portion 114 may be painted or otherwise colored. For example, if the wall 150 is to be covered with wallpaper, the user may wish to cover the low profile head portion with a piece of wallpaper prior to or after the bushing 110 has been installed in the manners described above.

Thus, from the foregoing discussion, it is apparent that the present invention provides unique and novel apparatuses and methods for supporting cables and other members within a structure such as a vertical wall or the like. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A method of installing a cable through a structure, the method comprising:

providing a bushing having a body portion having threads thereon and a distal end and a proximal end with a substantially planar head portion integrally attached thereto, the head portion having a low profile and a substantially smooth exterior surface with at least two cavities therein, the bushing further having a passageway extending through the body portion and the head portion;

providing a hole in the structure sized to receive the body portion of the bushing;

inserting the distal end of the bushing into the hole in the structure;

inserting engagement protrusions into the cavities in the head portion of the bushing and applying an installation force to the engagement protrusions to cause the bushing to be screwed into the hole in the structure;

removing the engagement protrusions from the cavities after the bushing has been screwed into the hole in the structure such that a rear surface of the head portion contacts the structure;

inserting a cable into the passageway; and reinserting engagement protrusions into the cavities in the head portion of the bushing and applying an installation force to the engagement protrusions to cause the bushing to be tightened into the hole in the structure while the cable protrudes outward through the passageway.

2. The method of claim 1 further comprising:

applying a covering to the structure prior to the providing a hole in the structure; and applying the covering to the head portion of the bushing.

3. The method of claim 2 wherein the covering is applied to the head portion of the bushing prior to the inserting the engagement protrusions.

4. The method of claim 2 wherein the covering is applied to the head portion after the bushing has been screwed into the hole in the structure.

* * * * *